Jan. 1, 1957  W. H. DIETZ  2,776,141
SEAL BALANCING NOVELTY
Filed June 23, 1955
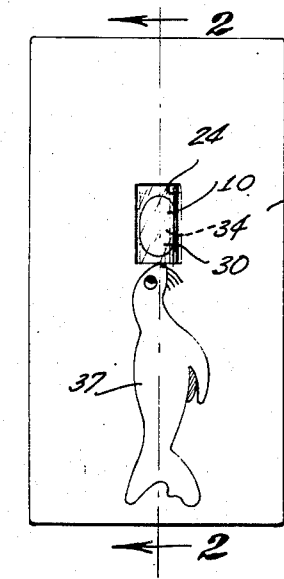
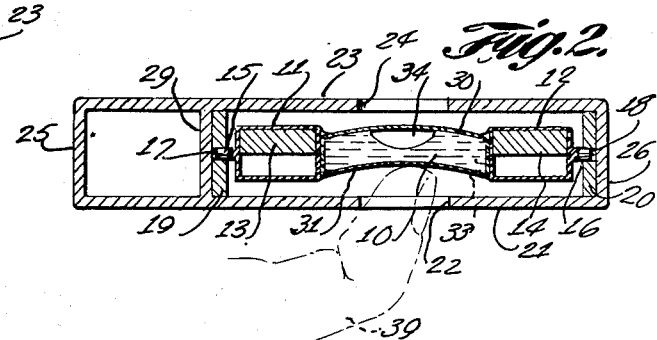
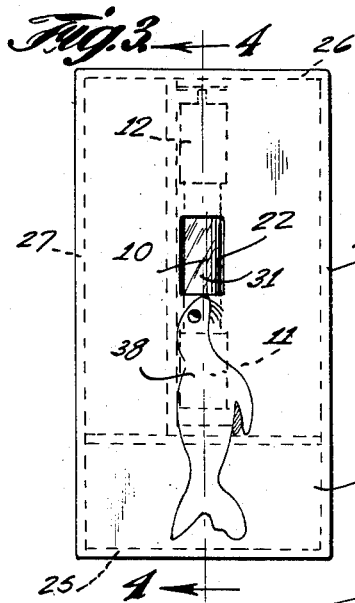
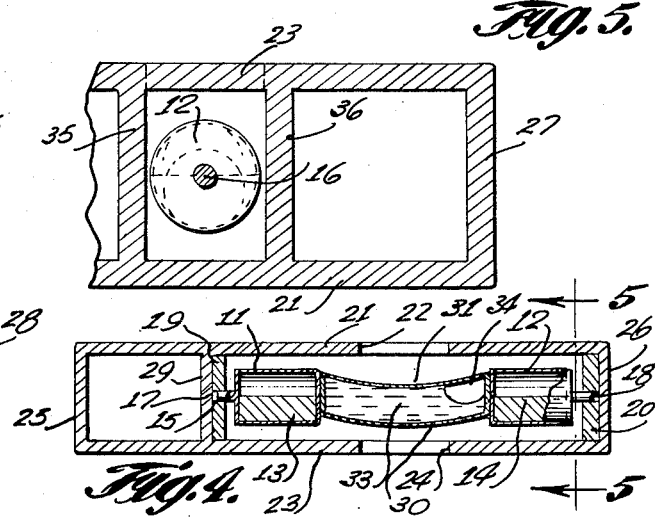
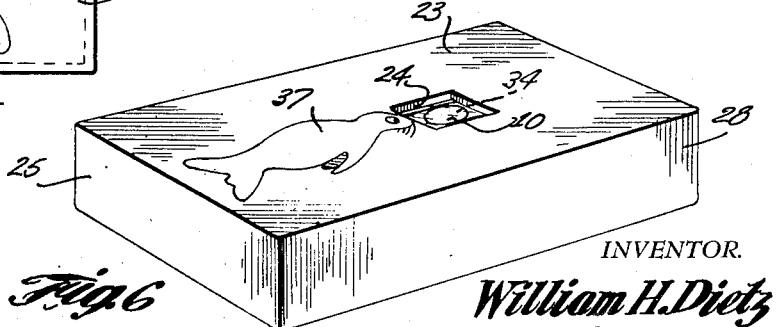
INVENTOR.
William H. Dietz
BY Victor J. Evans & Co.
ATTORNEYS

United States Patent Office 2,776,141
Patented Jan. 1, 1957

2,776,141

SEAL BALANCING NOVELTY

William H. Dietz, Pittsburgh, Pa.

Application June 23, 1955, Serial No. 517,517

1 Claim. (Cl. 273—153)

This invention relates to toys, particularly of the type used by magicians, and in particular, a bubble glass rotatably mounted in a casing with the glass adapted to be rotated by weights so that a bubble therein does not register with openings through the casing and wherein the glass is adapted to be actuated by the tip of a finger inserted through one of the openings so that the bubble will register with an opening in the upper or opposite side of the casing whereby the bubble will be positioned to appear to be balanced on the nose of a seal, representations of which are provided on opposite sides of the casing.

The purpose of this invention is to provide a novelty wherein a demonstrator shows a balloon or bubble balanced on the nose of a seal wherein without changing the position of the device it will be impossible for a second party to bring the bubble or balloon to a position upon the nose of the seal.

This seal balancing novelty is an improvement over the nerve test novelty of my prior Patent No. 2,701,139 in that in the device of the patent it was found necessary to reverse the position of the case in order to make the device inoperative whereas with the device of this invention it is not necessary to turn the case. Where it was necessary to turn the case, this action was readily observed by a second party so that it was comparatively simple to solve the problem.

With this thought in mind, this invention contemplates a seal balancing novelty wherein a bubble glass is held by a finger inserted through an opening in one side of a case so that it is possible to balance a balloon or bubble on the nose of a seal wherein with the finger removed the bubble glass is actuated by weights to such a position that it is impossible to bring the balloon or bubble into registering relation with an opening through the casing.

The object of this invention is, therefore, to provide means for mounting an arcuate bubble glass in a case whereby with the glass retained in one position by a finger inserted through an opening of the case an air bubble of the glass is positioned to register with an opening through a side wall of the case and wherein upon removal of the finger weights at the ends of the bubble glass turn the glass to such a position that an air bubble therein will not move to such a position that it will be in registering relation with openings through the casing.

Another object of the invention is to provide a toy balancing novelty having a flat rectangular shaped casing in which the device is adapted to operate with either side of the casing extended upwardly.

A further object of the invention is to provide a novelty of the sleight of hand type wherein a bubble representing a balloon is adapted to be positioned at the end of the nose of a seal in which the device is of a simple and economical construction.

With these and other objects and advantages in view, the invention embodies a box-like case having registering openings in upper and lower panels thereof with an arcuate bubble glass having sections with weights therein at the ends rotatably mounted in the case and positioned whereby the weights are adapted to turn the bubble glass so that the intermediate portion extends downwardly and wherein a finger exended through an opening in the lower part of the case is adapted to retain the bubble glass with the intermediate part extended upwardly so that an air bubble therein is adapted to register with the opening in the upper portion of the case.

Other features and advantages of the invention will appear from the following description, taken in connection with the drawing, wherein:

Figure 1 is a plan view of the novelty showing the device with the bubble glass held in the upwardly extended position whereby the bubble is in registering relation with an opening in the upper surface or panel of the case.

Figure 2 is a longitudinal section through the case taken on line 2—2 of Figure 1 also with the parts positioned whereby the bubble is in registering relation with the opening in the upper panel of the case.

Figure 3 is a view similar to that shown in Figure 1 with one of the side surfaces or panels extended upwardly and with the finger removed from the opening through the lower panel wherein the weights hold the bubble glass with the intermediate portion extended downwardly so that the bubble in the glass is positioned adjacent one end thereof.

Figure 4 is a longitudinal section through the case with the parts positioned as shown in Figure 3.

Figure 5 is a cross section through the case taken on line 5—5 of Figure 4 with the parts shown on an enlarged scale illustrating the relative positions of the weights and bubble glass.

Figure 6 is a perspective view showing the case with the parts in the positions as shown in Figures 1 and 2.

Referring now to the drawing, wherein like reference characters denote corresponding parts, the improved seal balancing or nerve testing novelty of this invention includes an arcuate tube 10 of transparent material suspended between cylindrical sections 11 and 12 in which weights 13 and 14 are positioned and the ends of the sections are provided with pins 15 and 16, respectively, that are rotatably mounted in openings 17 and 18 of bearing blocks 19 and 20; and the parts are positioned in a case having a lower panel 21 with an opening 22 therein, an upper panel 23 with an opening 24 therein, end walls 25 and 26, side walls 27 and 28, and an intermediate partition 29.

The bubble glass 10, which is formed on a radius, being arcuate in longitudinal section, is provided with a convex surface 30 and a concave surface 31 and the weights 13 and 14, which are fixedly secured in the cylinders 11 and 12, are positioned on the side of the axis on which the convex surface is positioned whereby with the parts released the weights drop downwardly to the position shown in Figure 4 whereby the concave surface of the tube is positioned on the upper side or extends upwardly.

The ends of the tube 10 are fused or otherwise secured to the ends of the cylinders 11 and 12 and the pins 15 and 16 are secured to the extended ends of the cylinders by suitable means.

The tube 10 is partly filled with liquid, as indicated by the numeral 33, and with the tube only partly filled an air space or bubble 34 is obtained whereby with the tube retained in the position shown in Figure 2 the bubble will assume a position on the high side of the tube wherein the bubble is in registering relation with one of the openings 24 or 22.

The case is also provided with longitudinally disposed partitions 35 and 36, between which the tube and weight cylinders are positioned.

The outer surfaces of the base and cover panels 21 and 23 are provided with representations of seals, as indicated by the numerals 37 and 38 and with one representation being a duplicate of the other either side of the case may be held upwardly when it is desired to bring the bubble into registering relation with the nose of the seal.

It is preferred to carry the case in a pocket and when it is desired to show the air bubble or balloon balanced on the nose of the seal a hand is placed in the pocket with the case and a finger, as indicated by the dotted lines 39, is placed through an opening in one side of the case and by pressing against the bubble glass or tube 10 the tube is adapted to be held with the convex surface extended upwardly, as shown in Figure 2, whereby the bubble 34 will assume a position in registering relation with the opening 24 and the bubble or balloon will appear to be balanced on the nose of the seal. In handing the case to a second party, the finger is removed from the opening whereby the weights 13 and 14 turn the bubble glass to the position shown in Figure 4 and in this position it will be substantially impossible to bring the bubble into registering relation with either of the openings 22 or 24, whichever is in the panel on the upper side of the case.

It will be understood, therefore, that it would be substantially impossible for a person not understanding the operation of the device to bring the bubble or balloon in registering relation with one of the openings of the case or to a balanced position on the nose of the seal.

It will be understood that modifications, within the scope of the appended claim, may be made in the design and arrangement of the parts without departing from the spirit of the invention.

What is claimed is:

In a toy puzzle, the combination which comprises a case having spaced parallel opaque panels connected at the edges with a continuous wall, said panels having registering openings extended therethrough and having representations of an animal on outer surfaces thereof, the animal being positioned whereby a nose is positioned to correspond with an end of one of said openings, an arcuate glass tube having a high point midway between its ends partly filled with liquid providing a bubble therein and having cylindrical end portions positioned between the panels, pins extended longitudinally from the ends of said cylindrical portions of the tube and loosely positioned in openings in bearings extended transversely of the case and positioned between the panels, and weights in the cylindrical portions of the tube and positioned to normally maintain the tube with its high point extended downwardly, said tube adapted to be held with the high point thereof extended upwardly by a finger extended through the opening of one of said panels, whereby to cause the bubble to appear adjacent the animal's nose.

References Cited in the file of this patent

UNITED STATES PATENTS

| | | |
|---|---|---|
| 657,675 | Quinby | Sept. 11, 1900 |
| 1,488,419 | Ward | Mar. 25, 1924 |
| 2,701,139 | Dietz | Feb. 1, 1955 |